United States Patent [19]

Jamison

[11] Patent Number: 4,647,386

[45] Date of Patent: Mar. 3, 1987

[54] INTERCALATED TRANSITION METAL BASED SOLID LUBRICATING COMPOSITION AND METHOD OF SO FORMING

[76] Inventor: Warren E. Jamison, 528 Parkview Ave., Golden, Colo. 80401

[21] Appl. No.: 538,137

[22] Filed: Oct. 3, 1983

[51] Int. Cl.$^4$ .......................................... C10M 125/22
[52] U.S. Cl. .................... 252/25; 423/561 R
[58] Field of Search ................... 252/25; 423/561 R

[56] References Cited

U.S. PATENT DOCUMENTS

| | | | |
|---|---|---|---|
| 3,573,204 | 3/1971 | Van Wyk | 252/12 |
| 3,763,043 | 10/1973 | Thompson | 252/12 |
| 3,769,210 | 10/1973 | Cais et al. | 252/25 |
| 4,040,917 | 8/1977 | Whittingham | 204/86 |
| 4,094,893 | 6/1978 | Dines | 252/25 |

*Primary Examiner*—Jacqueline V. Howard
*Attorney, Agent, or Firm*—Robert E. Harris

[57] ABSTRACT

A solid lubricating composition and method for forming such a composition are disclosed. The composition is formed by intercalating a transition metal that has been chemically reacted with chalcogen to form a layered structure. The transition metal is selected from niobium, tantalum, tungsten and/or an alloy including one or more, and the transition metal is chemically combined with chalcogen selected from sulfur, selenium and/or a combination which can also include tellurium to form a layered transition metal dischalcogenide prior to intercalation with a metal, preferably a coinage metal. The effect of intercalation is to expand the crystal lattice to create a composition having excellent lubricating characteristics the performance of which is not adversely effected by operation in a high temperature environment.

16 Claims, 5 Drawing Figures

INTERCALATED TRANSITION METAL BASED SOLID LUBRICATING COMPOSITION AND METHOD OF SO FORMING

Government Rights

The Government has rights in this invention pursuant to Contract No. F33615-78C-5196 awarded by the Department of Air Force.

FIELD OF THE INVENTION

This invention relates to a solid lubricating composition and method for forming such a composition, and, more particularly, relates to an intercalated transition metal based solid lubricating composition and method for so forming.

BACKGROUND OF THE INVENTION

Liquid lubricants are well known and such lubricants have been, and are now, successfully used for many diverse purposes. Liquid lubricants have not, however, proved to be satisfactory for some uses, including, for example, use in high temperature environments where combustion or pyrolysis of conventional liquid lubricants would occur, at extremely low temperatures where conventional liquid lubricants would freeze or gel, and/or in highly oxidizing environments where conventional liquid lubricants would present an explosion hazard.

For such uses, the powders of crystalline solids have long been used as lubricants, and, more specifically, powdered graphite has long been used in industry as a lubricant for use in hostile environments in which oils and greases are forbidden.

In its natural state, graphite absorbs moisture from the atmosphere and this moisture is essential to the graphite functioning as a lubricant. If graphite is exposed to a vacuum for extended periods however, the moisture is lost and the graphite becomes abrasive. To overcome this problem, graphite lubricating compositions, including iodine and other moisture substitutes, have heretofore been developed for specific applications.

Molybdenum disulfide ($MoS_2$), a natural material, has properties similar to those of graphite but does not require moisture for good lubricating performance. For this reason, molybdenum disulfide has more recently been used in the aerospace industry as a lubricant for satellites and space vehicles and in other areas where oils and greases are forbidden or difficult to employ, such as, for example, in self-lubricating bearings and food processing machinery. In addition, molybdenum disulfide has also been utilized as an additive to oils and greases to improve their performance at extremely high loads.

In attempting to improve the lubricating effectiveness of solid lubricants for space applications, it was empirically found that mixtures of silver, antimony oxide and molybdenum disulfide exhibited superior lubricating performance to molybdenum disulfide alone. Subsequently, it was found that other metal disulfides and diselenides, including tungsten disulfide ($WS_2$), molybdenum diselenide ($MoSe_2$), and tungsten diselenide ($WSe_2$) are good solid lubricants.

These materials are usually found in the form of powders, however, which are difficult to use as lubricants for at least some applications, including, for example, rolling bearings and mechanical components such as gears. Therefore, these powders are normally used in combination with binders which bond them to surfaces or are used in combination with a structural material to form self-lubricating solids.

While solid lubricants have heretofore been suggested and/or utilized, particularly where liquid lubricants could not be satisfactorily utilized, such solid lubricants have nevertheless not been found to be satisfactory, at least for some applications, and better solid lubricating compositions have therefore still been needed.

SUMMARY OF THE INVENTION

This invention provides an improved solid lubricating composition that is particuarly useful in hostile environments such as is presented under high temperature conditions. The lubricating composition is formed from a transition metal that has been chemically combined with a chalcogen to form a layered transition metal dichalcogenide (LTMD), and then intercalated with a metal to cause expansion of the crystal lattice.

It is therefore an object of this invention to provide an improved solid lubricating composition.

It is another object of this invention to provide an improved solid lubricating composition useful in hostile environments such as under high temperature conditions.

It is still another object of this invention to provide an improved solid lubricating composition that is an intercalated transition metal based solid lubricating composition.

It is still another object of this invention to provide an improved solid lubricating composition formed by chemically reacting a transition based metal with a chalcogen to form a layered transition metal dichalcogenide, and then intercalating the layered transition metal dichalcogenide with a metal to cause expansion of the crystal lattice.

It is still another object of this invention to provide an improved method for forming a solid lubricating composition.

It is yet another object of this invention to provide an improved method for forming a solid lubricating composition by reacting a transition metal with chalcogen to form a dichalcogenide and then intercalating the dichalcogenide.

With these and other objects in view, which will become apparent to one skilled in the art as the description proceeds, this invention resides in the novel construction, combination, arrangement of parts and method substantially as hereinafter described and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings, together with the specification, illustrate a complete embodiment of the invention according to the best mode so far devised for the practical application of the principles thereof, and in which.

DESCRIPTION OF THE INVENTION

Figure 1:
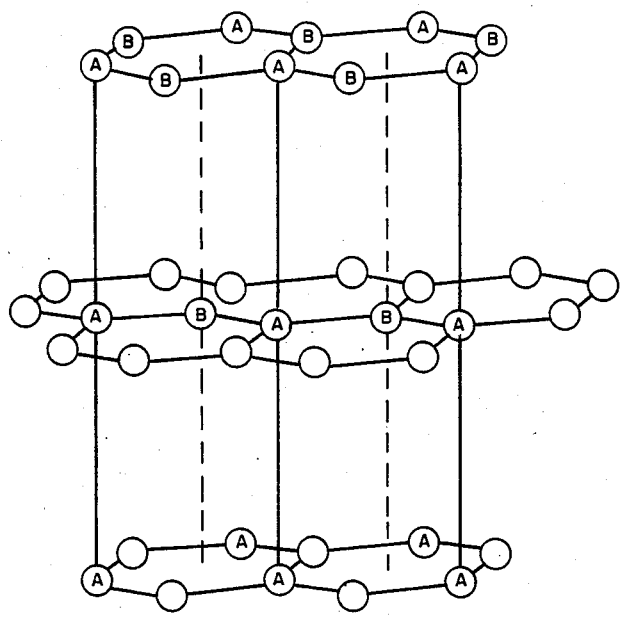
FIG. 1 is a representation of a stacked layered construction of graphite.

Graphite is composed exclusively of carbon atoms which are bonded together in two dimensional hexagonal arrays. Layers consisting of planar arrays of carbon atoms are stacked, as shown in FIG. 1. The chemical bonds within the layers are strong, while the bonds which hold the layers together are weak, allowing one layer to easily slide over another and this enables graphite to be effectively used as a lubricant.

Figure 2:
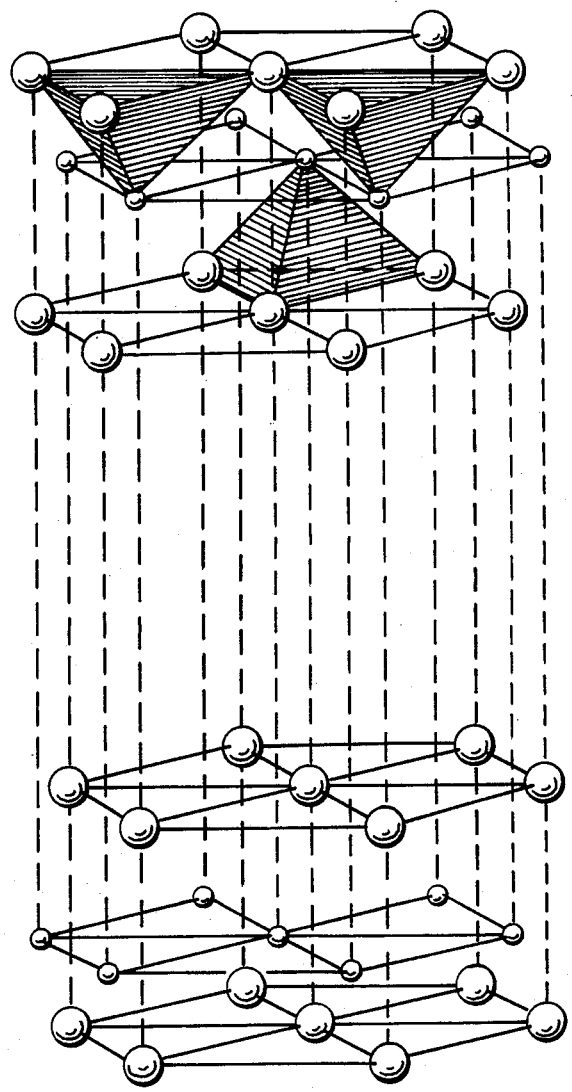
FIG. 2 is a representation of a stacked layered construction of molybdenum sulfide.

Molybdenum disulfide has a similar layered structure, as shown in FIG. 2, in which hexagonal arrays of molybdenum atoms are sandwiched between hexagonal arrays of sulfur atoms. The intra-layer chemical bonds are strong, while the inter-layer bonding is weak, and lubrication with molybdenum disulfide is effected by slip or shearing actions between the layers.

The group IV metals titanium (Ti), zirconium (Zr) and hafnium (Hf), the group V metals vanadium (V), niobium (Nb) and tantalum (Ta), and the group VI metals chromium (Cr), molybdenum (Mo) and tungsten (W) all form layered structures similar to that of molybdenum disulfide when combined with chalcogen (sulfur, selenium and tellurium) atom, and molybdenum and tungsten form good lubricating compositions when combined with sulfur or selenium.

The layered structure of niobium and tantalum disulfides and diselenides are quite similar to those of the good lubricating materials, but heretofore such structures have not exhibited good lubricating properties. In this invention by using intercalation reactions, coinage metal atoms are inserted between the layers in the crystal structures. The effect of these atoms is to cause an increase in the separation of the layers and a shift in the registry of one layer over another, to thereby effect good lubrication performance in these structures which previously exhibited poor lubricating qualities. In addition, the material thus formed by these intercalation reactions have superior structural properties to their molybdenum and tungsten disulfide counterparts, and have better high temperature lubricating performance.

As brought out more fully hereinafter, an improved lubricating composition preferably includes the transition metals niobium, tantalum and tungsten, chemically combined with the chalcogens sulfur, selenium and tellurium in the approximate ratio of one molecular weight of the metal to two molecular weights of the chalcogen.

The metal may be pure niobium, tantalum or tungsten, or an alloy of two or more in any ratio, or an alloy of any with another transition metal, or an alloy of any two with another transition metal, or an alloy of all three with another transition metal. The alloying transition metals may be chromium, vanadium, molybdenum, tungsten, iron or any other similar metal. These alloying transition metals should not exceed thirty atomic percent of the total transition metal content.

The chalcogens may be sulfur and selenium alone or in any combination, or a combination of sulfur and tellurium or selenium and tellurium, or sulfur, selenium and tellurium. In any combination, the tellurium content should not exceed fifty atomic percent of the total chalcogen content.

The transition metals (T) and chalcogens (X) are chemically reacted to produce a dichalcogenide ($TX_2$) with a layered structure similar to that shown in FIG. 2 for molybdenum disulfide. This is effected by mixing powders of the elements and sealing them in evacuated vials, which are heated to temperatures above 850° C. for at least 24 hours and then slowly cooled to room temperature. Alternate preparation procedures include passing hydrogen disulfide gas over powders of the metals at high temperatures and other procedures known to persons skilled in the art.

The transition metal dichalcogenides ($TX_2$) are further reacted with a metal which can intercalate the structure of the $TX_2$ compound to cause an expansion of the crystal lattice. Metals that can be utilized are copper, silver, gold, germanium, bismuth, lead, indium and gallium with the coinage metals copper, silver and gold being preferred. Germanium is known to produce good lubrication when intercalated into tantalum diselenide, although the lubricating properties do not appear to be as good as with coinage metal intercalates. The other listed metals are known to intercalate the transition metal dichalcogenides and produce crystal lattic expansions.

The metal intercalate species (M) may comprise from about five atomic percent to one hundred atomic percent of the transition metal (T) content ($M_{0.05} TX_2$ to $M_{1.00} TX_2$). With the coinage metals, intercalate contents of one-third of the transition metal content are preferred ($M_{0.33} TX_2$).

The intercalate metal may be combined with the $TX_2$ compound by mixing powders of the two materials in the desired proportion, and reacting the mixtures in evacuated vials at temperatures above 850° C. for 48 hours. Other preparation techniques may also be utilized, including electrochemical methods, for the intercalation reactions. With the coinage metals, powders of the elements (the transition metals, the chalcogens and the intercalate metals) may be mixed and reacted together in evacuated vials as described hereinabove.

Lubrication performance evaluations were made with a reciprocating tester and with a Faville-Levalley Flat Washer Tester. The reciprocating tester was operated in two modes. In the first mode, a cylindrical pellet of compacted solid lubricant was held with its axis vertical and its end loaded against a flat metal test coupon. A load of 1500 g produced a contact stress of 120 psi on the end of a 3/16 inch diameter pellet. The pellet was then moved slowly back and forth over a one inch track and the friction force measured. Also, visual observations were made on the wear and transfer of lubricant to the metal. In the second mode, a ¼ inch diameter steel ball was reciprocated under the same conditions over a solid lubricated substance.

The Faville-Levalley tester was fitted with a pellet holder and three 3/16 inch pellets on a 1.49 inch diameter circle were rubbed against a 52100 steel flat washer at a speed of 100 rpm (390 feet/min. sliding speed). A maximum load of 40 pounds was applied which produced a contact stress of 483 psi.

The reciprocating tester proved to be suitable for screening bad lubricants from marginal-to-good lubricants, but was not sufficiently sensitive to rank the latter group. The bad lubricants generally fell into two classes—those that transferred a non-lubricating film to the substrate, and those that were abrasive. The results are summarized in Table 1 as follows:

See Table 1 at end of Specification.

The non-lubricating film formers included $TiS_2$, $TaS_2$ and their intercalated structures as listed in Table 1. Abrasive materials that would not form burnished films and could not be pressed into pellets included $PbTaS_2$, $PbTiS_2$, $GeTiS_2$, $CuTiS_2$, and $AgTiS_2$. Generally, the intercalated structures of the niobium dichalcogenides formed metallic-looking transfer films and ran smoothly with reasonable friction coefficients.

The lubrication performance tests on the Faville-Levalley tester were conducted on the niobium sulfides and selenides, tungsten selenides, a single intercalated tantalum selenide and molybdenum disulfide as a baseline material. Results of the tests made on the Faville-Levalley Tester as shown in Table 2 as follows:

See Table 2 at end of Specification.

Figure 3:
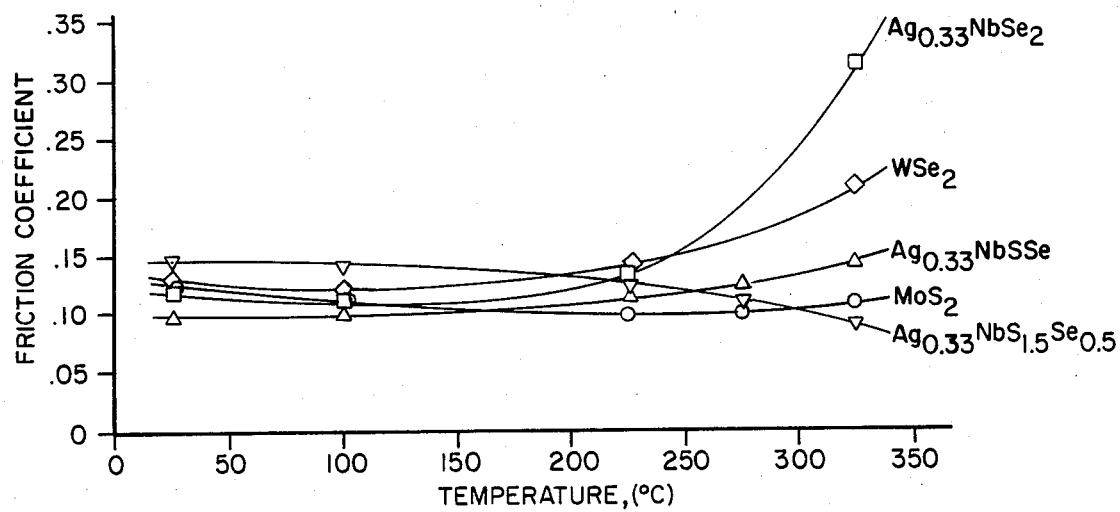
FIG. 3 is a graph showing friction coefficient versus temperature for selected solid lubricants.

Pellets made from commercial molybdenum disulfide were tested three times during the course of the experimental program, and the results were used as a basis for comparison of other experimental solid lubricants. The molybdenum disulfide ($MoS_2$) ran smoothly with low friction at temperatures up to 320° C. (608° F.), even though the high temperature lubricating properties were reported to be poor. A minimum in friction coefficient was observed at 225° C. As shown in FIG. 3, minimum in friction coefficients were observed at this temperature for a variety of materials.

Tungsten diselenide also is a known good lubricant, and exhibited only slightly inferior properties in these tests to $MoS_2$. Pellets of $WSe_2$ were much softer than pellets of $MoS_2$, built a metallic looking transfer film and wore at a more rapid rate than $MoS_2$. Silver intercalated $WSe_2$ exhibited a 2.6% increase in c/na ratio and was much softer than even the $WSe_2$. The material was so soft that the pellets wore away rapidly and smeared material over the test fixture. The slightly higher friction is attributed to a larger contract area from the smeared material. Although the Ag intercalated $WSe_2$ did not perform well as a solid lubricant in these tests because of excessive softness, the softness may not be detrimental in applications where the lubricant is integrated into a supporting stucture, and it is expected that the intercalated $WSe_2$ will exhibit superior lubrication performance to non-intercalated $WSe_2$, particularly at high temperatures.

Contrary to $WSe_2$, the $Ag_{\frac{1}{3}}WSe_2$ did not exhibit significantly increased friction at high temperatures. An insufficient amount of the $Cu_{0.33}WSe_2$ was available for a thorough evaluation, although preliminary results showed it to be harder than the silver intercalated material.

$NbS_2$ and $NbSe_2$ were confirmed to be poor lubricants by their inability to provide low friction sliding as shown in Table 2. Both of these compounds exhibited such high friction that the pellets disintegrated under the conditions of the test.

Figure 4:
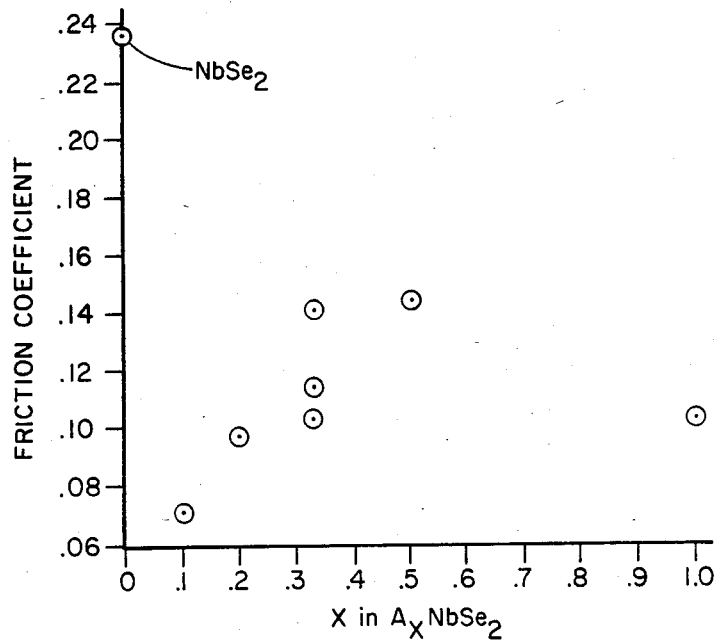
FIG. 4 is a plot of friction coefficients versus silver concentration in $A_xNbSe_2$.

Intercalation of silver into the $NbSe_2$ structure was accomplished at five different silver concentrations, ranging from 0.1 to 1.0 times the atomic niobium concentrations. With even less than a 3% lattice expansion the effects on lubrication performance are shown to be quite remarkable. The room temperature friction coefficients from Table 2 have been plotted against silver intercalate contents in FIG. 4. Intercalation of only 0.1 silver atoms per niobium atom changed the transformed $NbSe_2$ from a poor to a good lubricant, reducing the friction coefficient from 0.238 to 0.070, lower than that of $MoS_2$ or $WSe_2$ under the same conditions. This is attributed more to the change in structure from 2H $NbS_2$ to 2H $MoS_2$ then to any change in interlayer spacing. Addition of more silver increased the friction coefficient. This effect is probably due to the greater quantity of silver ions in the van der Waals gap inhibiting the interlayer slippage.

Only the $Ag_{0.33}NbSe_2$ materials were tested at elevated temperatures. These samples generally showed a monotonic increase in friction with increasing temperature, rather than a minimum friction at temperatures in the 200° C. to 250° C. range, the cause of which is unknown.

Copper was intercalated into the $NbSe_2$ structure at $\frac{1}{3}$ Cu atom per Nb atom. The structural changes are felt to be parallel to those of the Ag intercalated $NbSe_2$. This material also exhibited excellent lubricating potential, with a friction coefficient which rose steadily from 0.070 as temperature was increased.

Figure 5:
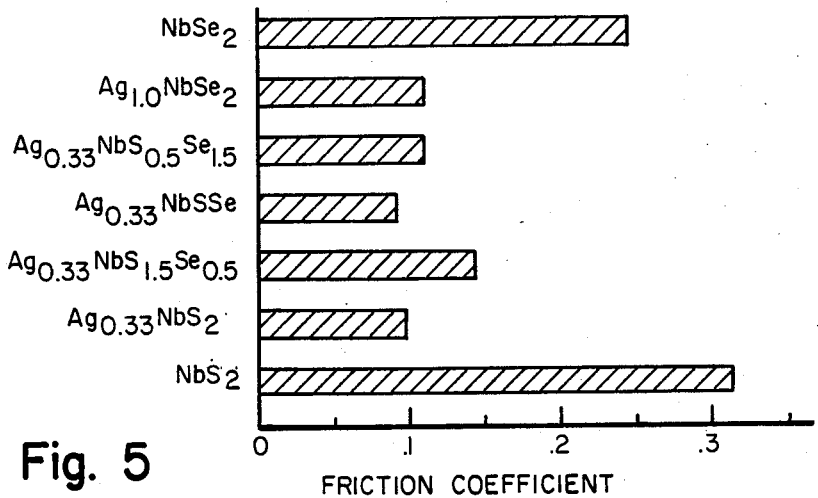
FIG. 5 is a bar graph showing room temperature friction coefficients for $Ag_xNbS_ySe_{2-y}$ and related materials.

Whereas $NbS_2$ is a poor lubricant, intercalation of silver at 0.33 atoms per Nb atom transformed it into a good lubricant as shown in Table 2, just as it transformed $NbSe_2$ into a good lubricant. Mixed sulfides and selenides show better lubrication performance than either of the pure sulfides or selenides. For this reason, a series of samples were made at a constant silver content with various sulfur and selenium contents. FIG. 5 shows the friction coefficient of these and related materials. Basically, all compositions containing intercalated silver proved to be good lubricants, with marginally better performance as the sulfur content was increased.

Intercalation of copper into NbSSe produced the expected level of lattice expansion, but did not improve lubrication performance over that of copper intercalated $NbSe_2$.

Intercalation of silver into $TaSe_2$ provided a structure with poor performance as a solid lubricant as shown in Table 2.

In summary, the experimental work conducted shows that material with good lubricating potential (at least to 600° F.) can be prepared by intercalating niobium disulfides and diselendies with copper and silver. The chemical and physical theory of intercalation with these metals suggests that the same properties can be imbued in comparable tantalum compounds.

The experimental work also showed that the best lubricating performance (under the conditions of testing) was achieved at the lower concentrations of intercalate atoms, although performance was not significantly impaired at higher concentrations. It is suggested however, that better high temperature lubrication can be achieved with higher intercalate concentrations, wherein excess intercalate can inhibit intra-crystalline shear and can promote stability through sacrificial oxidation.

As can be appreciated from the foregoing, this invention provides an improved solid lubricating composition utilizing a transition metal based solid lubricant that has been reacted with a chalcogen and then intercalated by a metal, as well as an improved method for forming such a composition.

TABLE 1

| Test No. | Config. | Lubricant | Substrate | Friction Coeff. | Temp. (°F.) | Observations |
|---|---|---|---|---|---|---|
| R1a | Pellet | $MoS_2$ | Steel | 0.179 | room | |
| R1b | Pellet | $MoS_2$ | Copper | 0.156 | room | |
| R2a | Ball | $MoS_2$ | Steel | 0.074 | room | |
| R3a | Pellet | $TiS_2$ | Steel | 0.190 | room | |
| R3b | Pellet | $TiS_2$ | Copper | 0.200 | room | |
| R3c | Pellet | $TiS_2$ | Brass | 0.193 | room | |
| R3d | Pellet | $TiS_2$ | Alum. | 0.163 | room | |
| R3e | Pellet | $TiS_2$ | Steel | 0.210 | 300 | |
| R3f | Pellet | $TiS_2$ | Steel | 0.190 | 500 | |
| R3g | Pellet | $TiS_2$ | Steel | 0.177 | 750 | |
| R3h | Pellet | $TiS_2$ | Steel | — | 1000 | Stick-slip |
| R4a | Pellet | $GeTaS_2$ | Copper | 0.150 | room | High freq stick-slip |
| R5a | Ball | $GeTaS_2$ | Copper | 0.183 | room | Dull grey burnished film |
| R6A | Pellet | $Cu_{0.67}TaS_2$ | Copper | 0.213 | room | |
| R7a | Ball | $Cu_{0.67}TaS_2$ | Copper | 0.348 | room | Film broke down |
| R8a | Pellet | $TaS_2$ | Copper | 0.154 | room | Violent stick-slip |
| R9a | Ball | $TaS_2$ | Copper | 0.348 | room | Film broke down. Sample 105-1, previous program |
| R10a | Pellet | $NbS_2$ | Copper | 0.146 | room | Leaves transfer film |
| R11a | Pellet | $MoS_2$ | Copper | 0.140 | room | |
| R12a | Ball | $MoS_2$ | Copper | 0.100 | room | |
| R13a | Ball | $Cu_{1.0}NbSe_2$ | Copper | 0.181 | room | Sample 125-1 from previous program |
| R14A | Ball | $Ag_{0.67}NbSe_2$ | Copper | 0.109 | room | Sample 124-3 from previous program |
| R15a | Ball | $Cu_{0.67}NbS_2$ | Copper | 0.116 | room | Sample 124-2 from previous program |
| R16a | Ball | $Ag_{0.67}NbS_2$ | Copper | 0.090 | room | Sample 124-1 from previous program |
| R17a | Ball | $MoS_2$ | Copper | 0.069 | room | |
| R18a | Pellet | $Ag_{0.33}NbS_{0.5}Se_{1.5}$ | Brass | 0.110 | room | |
| R18b | Pellet | $Ag_{0.33}NbS_{0.5}Se_{1.5}$ | Steel | 0.110 | room | |
| R19a | Pellet | $Ag_{0.33}NbSSe$ | Steel | 0.218 | room | |
| R19b | Pellet | $Ag_{0.33}NbSSe$ | Brass | 0.311 | room | |
| R20A | Pellet | $Ag_{0.33}NbS_{1.5}Se_{0.5}$ | Brass | 0.127 | room | |
| R20b | Pellet | $Ag_{0.33}NbS_{1.5}Se_{0.5}$ | Steel | 0.127 | room | |

TABLE 2

| Test No. | Lubricant | Sample No | Room Temp | Friction Coefficient | | | |
|---|---|---|---|---|---|---|---|
| | | | | 100° C. | 225° C. | 270° C. | 320° C. |
| F1 | $MoS_2$ | Comml | 0.114 | 0.111 | 0.084 | 0.094 | 0.104 |
| F2 | $MoS_2$ | Comml | 0.114 | 0.114 | 0.084 | 0.094 | 0.101 |
| F3 | $MoS_2$ | Comml | 0.141 | 0.141 | — | — | — |
| F4 | $NbSe_2$ | Comml | 0.238 | 0.416 | (a) | (a) | (a) |
| F5 | $NbSe_2$ | Comml | 0.238 | 0.420 | (a) | (a) | (a) |
| F6 | $NbS_2$ | 127-1 | 0.336 | (a) | (a) | (a) | (a) |
| F7 | $WSe_2$ | 132-3 | 0.128 | 0.097 | 0.097 | 0.141 | 0.201 |
| F8 | $Ag_{0.33}NbS_2$ | 128-1 | 0.094 | 0.138 | 0.064 | — | — |
| F9 | $Ag_{0.1}NbSe_2$ | 137-3 | 0.070 | — | — | — | — |
| F10 | $Ag_{0.2}NbSe_2$ | 138-1 | 0.097 | — | — | — | — |
| F11 | $Ag1_{10.33}NbSe_2$ | 138-2 | 0.101 | 0.104 | 0.114 | 0.181 | 0.299 |
| F12 | $Ag_{0.33}NbSe_2$ | 134-1 | 0.114 | 0.101 | 0.128 | — | 0.315 |
| F13 | $Ag_{0.33}NbSe_2$ | 128-2 | 0.141 | 0.134 | 0.074 | — | — |
| F14 | $Ag_{0.5}NbSe_2$ | 138-3 | 0.144 | — | — | — | — |
| F15 | $Ag_{1.0}NbSe_2$ | 138-4 | 0.104 | — | — | — | — |
| F16 | $Ag_{0.33}NbS_{0.5}Se_{1.5}$ | 135-3 | 0.101 | 0.144 | 0.141 | 0.128 | 0.181 |
| F17 | $Ag_{0.33}NbSSe$ | 133-2 | 0.094 | 0.091 | 0.091 | 0.111 | 0.138 |
| F18 | $Ag_{0.33}NbSSe$ | 137-2 | 0.094 | 0.094 | 0.117 | 0.104 | 0.134 |
| F19 | $Ag_{0.33}NbS_{1.5}Se_{0.5}$ | 135-4 | 0.138 | 0.134 | 0.104 | 0.114 | 0.084 |
| F20 | $Ag_{0.33}WSe_2$ | 129-2 | 0.114 | (b) | (b) | (b) | (b) |
| F21 | $Ag_{0.33}WSe_2$ | 132-4 | 0.121 | 0.148 | 0.144 | 0.104 | 0.107 |
| F22 | $Ag_{0.33}TaSe_2$ | 128-3 | 0.188 | 0.138 | 0.342 | (a) | (a) |
| F23 | $Cu_{0.33}WSe_2$ | 129-3 | 0.134 | (c) | (c) | (c) | (c) |
| F24 | $Cu_{0.33}NbSe_2$ | 133-3 | 0.080 | 0.067 | 0.131 | 0.185 | 0.282 |
| F25 | $Cu_{0.33}NbSSe$ | 137-1 | 0.117 | 0.128 | 0.272 | 0.295 | 0.309 |

(a) Pellets disintegrated from high friction.
(b) Pellets crushed from insufficient structural strength, but left good transfer film.
(c) Insufficient material to complete testing.

What is claimed is:

1. An intercalated transition metal based solid lubricating composition, comprising:
a transition metal selected from one of tungsten and an alloy including at least one of niobium, tantalum and tungsten that also includes an alloying metal selected from one of chromium, vanadium, molybdenum, tungsten and iron;

a chalcogen selected at least in part from one of sulfur, selenium, a combination of sulfur and selenium, a combination of sulfur and tellurium, a combination of selenium and tellurium, and a combination of sulfur, selenium and tellurium, said chalcogen being reacted with said transition metal to form a layered transition metal dichalcogenide; and an intercalating metal intercalating said layered transition metal dichalcogenide, said intercalating metal being selected at least in part from one of copper, silver, gold, germanium, bismuth, lead, indium and gallium, and said intercalating metal content being equal to between about five atomic percent and one hundred atomic percent of said transition metal content.

2. The composition of claim 1 wherein said alloying metal does not exceed about thirty atomic percent of the total transition metal content.

3. The composition of claim 1 wherein said tellurium in any said combination does not exceed fifty atomic percent of the total chalcogen content.

4. The composition of claim 1 wherein said intercalating metal content comprises about one-third of said transition metal content.

5. An intercalated transition metal based solid lubricating composition, comprising a layered transition metal dichalcogenide that has been formed from a transition metal reacted with a chalcogen to form niobium dichalcogenide $Nb S_y Se_{2-y}$ where $0<y<2$, which has been reacted with a coinage metal to produce an intercalated species $M_{0.33} NbS_y Se_{2-y}$ where M represents a coinage metal selected from one of silver, copper and gold.

6. The composition of claim 5 wherein said layered transition metal dichalcogenide is a niobium dichalcogenide $Nb S_y Se_{2-y}$ where $0<y<2$, which has been reacted with a coinage metal to produce an intercalated species $M_{0.33} NbS_y Se_{2-y}$ where M represents a coinage metal selected from one of silver, copper and gold.

7. An intercalated transition metal based solid lubricating composition, comprising a layered transition metal dichalcogenide that has been formed from a transition metal reacted with a chalcogen to form tantalum dichalcogenide $TaS_y Se_{2-y}$ where $0<y<2$, which has been reacted with a coinage metal to produce an intercalated species $M_{0.33} TaS_y Se_{2-y}$ where M represents a coinage metal selected from one of silver, copper and gold.

8. An intercalated transition metal based solid lubricating composition, comprising a layered transition metal dichalcogenide that has been formed from a transition metal reacted with a chalcogen to form tungsten dichalcogenide $WS_y Se_{2-y}$ where $0<y<2$, which has been reacted with a coinage metal to produce an intercalated species $M_{0.33} WS_y Se_{2-y}$ where M represents a coinage metal selected from one of silver, copper and gold.

9. The composition of claim 5 wherein said layered transition metal dichalcogenide includes an alloying metal that does not exceed thirty atomic percent of the total transition metal content.

10. A method for forming an intercalated transition metal based solid lubricating composition, said method comprising:

selecting a transition metal from one of niobium, tantalum, tungsten, and an alloy including at least one of niobium, tantalum, and tungsten;

mixing and chemically reacting a chalcogen, selected at least in part from one of sulfur, selenium, a combination of sulfur and selenium, a combination of sulfur and tellurium, a combination of selenium and tellurium, and a combination of sulfur, selenium and tellurium, with said transition metal to form a layered transition metal dichalcogenide; and intercalating by mixing and chemically reacting said layered transition metal dichalcogenide with an intercalating metal, selected at least in part from one of copper, silver, gold, germanium, bismuth, lead, indium and gallium, with said intercalating metal content being equal to between about five atomic percent to one hundred atomic percent of said transition metal content, to form a composition having useful lubricated properties.

11. The method of claim 10 wherein said step of selecting said transition metal includes selecting said alloying metal from one of chromium, vanadium, molybdenum, tungsten and iron.

12. The method of claim 11 wherein said step of selecting said transition metal includes selecting said alloying metal so that said alloying metal does not exceed about thirty atomic percent of the total transition metal content.

13. The method of claim 10 wherein said step of combining a chalcogen with said transition metal includes selecting said chalcogen from one of sulfur, selenium, a combination of sulfur and selenium, a combination of sulfur and tellurium, a combination of selenium and tellurium, and a combination of sulfur, selenium and tellurium.

14. The method of claim 13 wherein said step of combining a chalcogen with said transition metal includes selecting tellurium in any said combination so that said tellurium does not exceed fifty atomic percent of the total chalcogen content.

15. The method of claim 10 wherein said step of intercalating said layered transition metal dichalcogenide includes selecting said metal from one of silver, copper and gold.

16. The method of claim 10 wherein said step of intercalating said layered transition metal dichalcogenide includes selecting an intercalating metal content that comprises about one-third of said transition metal content.

* * * * *